March 17, 1970  G. J. GILLESPIE ET AL  3,501,359

METHOD OF MAKING A REINFORCED FILAMENT WOUND PIPE

Filed Dec. 14, 1967

INVENTORS
GERALD J. GILLESPIE &
LAWRENCE C. COUCHOT
BY William J. Kratz, Jr.
their Agent

United States Patent Office 3,501,359
Patented Mar. 17, 1970

3,501,359
METHOD OF MAKING A REINFORCED FILAMENT WOUND PIPE
Gerald J. Gillespie, Jeannette, and Lawrence C. Couchot, Pittsburgh, Pa., assignors to Koppers Company, Inc., a corporation of Delaware
Filed Dec. 14, 1967, Ser. No. 690,467
Int. Cl. B29c 27/26
U.S. Cl. 156—84         7 Claims

ABSTRACT OF THE DISCLOSURE

Acid-resistant, filament-wound pipe is prepared by a process which provides an outer shell of resin-impregnated glass fiber over a pre-shrunk polypropylene or polyester fabric. The pipe is resistant to sulfuric, phosphoric, and fluosilicic acid over wide ranges of temperature and concentration.

Background of the invention

Resin-impregnated, glass-filament reinforced pipe has become an important article of comerce in recent years. Such pipes are generally manufactured by winding the reinforcement on a mandrel, the reinforcement being either pre-impregnated with resin or so impregnated during the winding process. After the winding process, the resin is cured at an elevated temperature, and a product is produced which conforms to the shape of the mandrel on which it has been wound. Such filament-wound pipes are characterized by a high strength to weight ratio, and are becoming increasingly valuable in the chemical process industries. Glass fiber reinforced plastic pipe is generally produced by wrapping rovings of glass fibers about a mandrel or form. Typically, the glass fibers are fed from spools through a resin bath to impregnate the fibers with resins. The impregnated glass fibers are then helically wrapped about the mandrel. Alternatively, the resin may be applied during or after the winding of the fiber on the mandrel. Either the mandrel or the fiber is caused to move parallel to the longitudinal axis of the mandrel. When the end of the pipe is reached, the movement is reversed and the winding now spirals back over the previous winding forming a helical angle differing from that of the first layer.

Heretofore, resin-impregnated, glass filament-wound pipes have not been suitable for use in the certain chemical processes because of acidic reagents present in plant process lines which are extremely corrosive to glass and to glass-reinforced pipe. More specifically, fluosilicic acid, which is present in certain process lines, readily attacks the glass in glass reinforced pipe. The fluosilicic acid is usually mixed with various concentrations of phosphoric acids and sulfuric acid. Thus, a need exists in the chemical process industry for a resin-impregnated, glass-reinforced pipe resistant to acid attack.

Summary of the invention

According to the present invention, there is provided a multi-laminae fiber reinforced resin pipe comprised of an innerliner of at least one lamina of a pre-shrunk polypropylene or polyester acid resistant fabric having overwound thereon one or more laminae of resin impregnated glass fibers, the innerliner and overwind being integrally bonded with a heat hardened resin.

The reinforced pipe is prepared by a process comprising the pre-shrinking of the polyester or polypropylene fabric at an elevated temperature, impregnating the fabric with the polyester resin and forming at least one lamina of said pre-shrunk fabric on a mandrel. There is then wound over the polypropylene or polyester fabric, polyester resin dipped glass fiber rovings, and the multi-laminae resin impregnated pipe is cured to integrally bond the various laminae.

Detailed description

Figure 1:
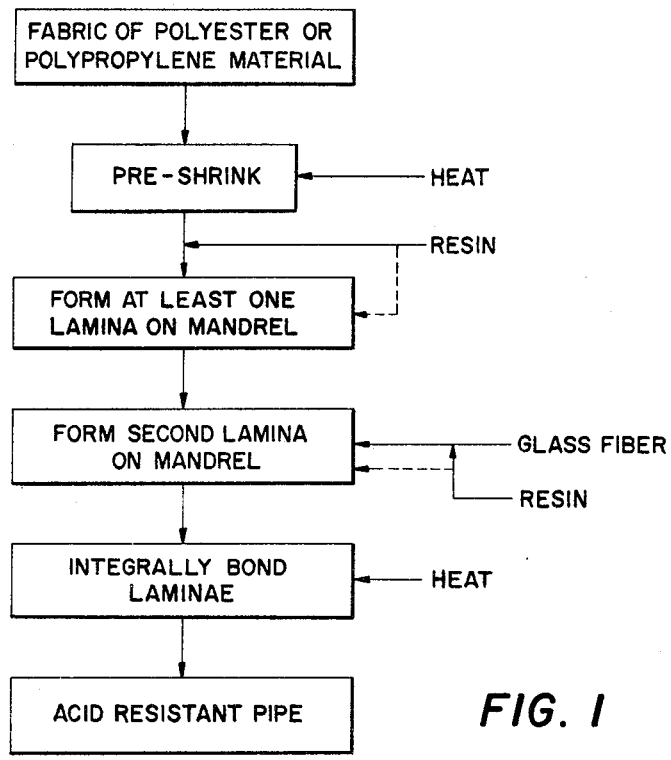
FIGURE 1 is a description of the process of the invention by flow diagram.

The acid-resistant pipe of the invention is prepared by winding at least one pre-shrunk acid resistant fabric of polypropylene or polyester material upon a mandrel, the mandrel having an outside diameter equal to the inside diameter of the pipe being prepared.

The fabric forming the innerliner of the pipe is formed from polyester or polypropylene material which are stable to temperatures in excess of 120° C. and which are chemically resistant. The term "fabric" as used herein is meant to include both non-woven and woven materials either mechanically bonded or internally bonded with a suitable resin, such as an acrylic resin, or a modified acrylic resin such as an acrylic-polyester resin, which is also resistant to acid attack. The terms, mat, veil, felt, and cloth are used interchangeably to signify these fabric systems and are words generally known in the art.

At least one fabric to be used for the innerliner of the pipe of the invention is first pre-shrunk by subjecting the fabric to temperatures in the order of 120–150° C. for a period of time and then cooling the fabric. This exposure to heat, before the resin impregnation, shrinks the polyester or polypropylene so that upon subsequent heating, during the resin curing stage of the pipe manufacture and cooling of the pipe composition, the innerliner will not shrink and separate from the overwind or exterior wall of the pipe. The actual physical modification of the polymers is not fully understood, but it appears that some change in the polymer material itself is caused by the pre-shrinking which then prevents, on subsequent curing of the resin in the pipe manufacture, the separation of the innerliner from the glass roving overwind.

With polypropylene fabrics, temperatures in the order of 120–140° C. at exposure times of approximately 1–4 hours are preferred. Polyester fibers may be subjected to temperatures in the order of 120–150 C. preferably for a period of about 2 to 6 hours in order to provide suitable pre-shrinking of the polyester material for use in the manufacture of the pipe of the present invention.

Following the pre-shrinking or heat treating of the polyester or polypropylene fabrics, the fabric is then saturated with a suitbale heat-hardening resin, preferably a polyester resin. If desired, the saturation of the polyester or polypropylene fabric may be done after the fabric is applied to the mandrel used in the pipe manufacture, but pre-impregnation of the fabric is preferred.

The polyester or polypropylene fabrics are next wound around a mandrel having an outer diameter the dimension of the inner diameter of the pipe to be produced. The fabrics may be wound by conventional filament winding procedures which involve among others, the helically winding of the material around a suitable mandrel.

Following the winding of the resin-impregnated polypropylene or polyester fabric on the mandrel, a second lamina of resin impregnated polypropylene or polyester fabric, the same or different from the first, may be overwound on the first. Or, if desired, the pipe wall thickness may be increased merely by overwinding on the fabric layers or resin impregnated glass mats or glass fibers. The overlayer of resin impregnated glass fibers is helically wound on the fabric covered mandrel, the resin-impregnated glass fiber material being applied by generally known procedures. Or, if an increase in the size of the wall of the pipe is desired, glass fiber mats may be wound over the polypropylene or polyester matrices before the fiber glass rovings are wound thereon. In either case, conventional methods of winding the glass fibers on the mandrel are usable.

The preferred resin system used to saturate the polypropylene and polyester fabrics and to coat the glass fiber overwind is preferably and unsaturated polyester resin system. Suitable polyester resins are well known for use in filament winding processes. Of course, specifically useful are the known polyester systems which are themselves exceptionally resistant to chemical attack and which provide good bonding of glass fibers impregnated with said resin. In addition, an epoxy anhydride resin system could, if desired, be used.

The resin content of the multi-laminae pipe of the present invention is higher than the resin content of conventional general purpose reinforced pipe. The resin content should be in the order of 35 to 45 percent by weight of the total system. Of this amount, 70–80% by weight of the polyester resin should be present in the interior laminae of the pipe, thus providing the best protection from acids carried therethrough. This large amount of the overall resin content is provided on the interior laminae by the use of the above-described polyester or polypropylene fiber fabric which hold large amounts of the resin.

Figure 2:
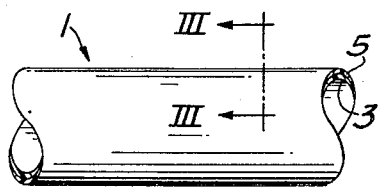
FIGURE 2 is a section of the pipe of the present invention which can be produced by the process of the invention.
Figure 3:
FIGURE 3 is a cross-section view of the pipe of the invention along lines III—III of FIGURE 2.

The pipe of the present invention comprises an innerliner of at least one wound fabric of a material selected from the polyester and polypropylene and the overwind of a wound glass fiber roving, the laminae being integrally bonded by a heat-hardened resin. The pipe is illustrated in FIGURES 2 and 3, which show the innerlining 3 of a polyester or polypropylene matrix saturated with polyester resin and the overwind 5 of wound glass fiber rovings. Although examination of the pipe will show somewhat of a demarcation line between the innerlining and the overwind, by using preshrunk fabrics, there is no separation and no voids between the two liners, and the polyester resin system provides integral bonding of the laminae to produce the novel pipe of the invention.

The invention is further illustrated by the following examples.

EXAMPLE I

A roll of a polyester veil having a width of about four and one-half to five inches (0.003′ thickness, 0.6 oz./yd.$^2$, Style Kt1751, produced by Pellon Corp.) was pre-shunk by subjecting it to a temperature of 120° C. for 6.0 hours.

A roll of four inch width polypropylene mat (1.8″ thick, 4.5 oz./yd.$^2$ produced by Vectra Co.) was preshrunk by subjecting it to a temperature of 120° C. for 4.0 hour period.

A pipe section was formed using the above-pre-shrunk fabrics as follows: a layer of the resin impregnated pre-shrunk polyester veil was wrapped on a mandrel with a ¼″ overlap, the mandrel having the size to give the desired interior diameter of the pipe to be fabricated. A layer of the above polypropylene mat, resin impregnated, also with a ¼″ overlap was then applied over the polyester veil. The veil and mat hold thirteen times their weight of polyester resin on impregnation. A final layer of glass roving overwind resin impregnated was next applied. The details of the resin used and process are listed in Table I. After winding, the pipe innerliner and overwind were air bubble free.

The pipe was cured for 2.0 hours at 100° C. to gel the resin and then 4.0 hours at 120° C. to obtain final cure. The pipe wall total thickness was 0.125″–0.140″, the glass overwind thickness being 0.090″ and the innerliner varying between 0.035″–0.050″. The pipe innerliner surface was smooth and hard. Cut rings from the pipe showed a well-bonded composite of fabric liner and overwind glass with the resin system. The liner fabrics and resin content of the total pipe was 36 weight percent.

The NOL split disc tensile strength at 75° F. of this pipe composition was 20,365 p.s.i. and the pipe had a $6.05 \times 10^5$ modulus of elasticity.

TABLE I

Fabrication of a 2″ interior diameter polyester resin pipe containing a liner composite of pre-shrunk non-woven polypropylene fiber mat and polyester fiber surfacing veil with a fiberglass overwind Liner construction:
    Surfacing veil—KT1 751 polyester, 0.6 oz./yd.$^2$, 1 layer modified acrylic binder.
    Pre-shrink treatment—6.0 hours, 120° C., 3% linear shrinkage.
    Back-up mat—Polypropylene, 4.5 oz./yd.$^2$, 1 layer, mechanical bond.
    Pre-shrink treatment—4.0 hours, 120° C., 3% shrinkage.
    Resin system—90/10 wt. percent chemical resistant polyester resin/Atlac 382–05; flexibilizer resin/Atlac 387–03; 2% BPO paste, 50% active.
Overwind fiberglass
    Type glass—O.C.F. 893 finish, K filament, 8 ends/roving.
    Tension—1 lb./roving at creel.
    Geometry—Band width of 4 rovings, roving band at 54¾° angle, 4 layers of roving. Reverse drum bucket.
    Resin system—Same as above.
    Winding process—Wet wind.
    Pipe cure—2.0 hours, 100° C., +4.0 hours, 120° C.

The pipe was tested for chemical resistance and mechanical properties. Pipe sections were capped with a polyester resin/polypropylene mat liner to seal the pipe end. The capped sections were then loaded with various acid solutions and any attack at 200° F. noted. The results after one month contact are listed in Table II.

TABLE II

Chemical resistance after 1 month at 200° F.

Pipe section: 2.5″ x 2.0″ diameter end cap

| Chemical | Acid Mix Parts | Wt. Change, percent | Comments |
|---|---|---|---|
| Oven air, 200° F. | | −0.1 | Liner white, no change. |
| Fluosilicic acid, 15% | | 1.0 | Liner white, no attack. |
| Fluosilicic acid, 5% | | 0.9 | Do. |
| Fluosilicic acid, 1% | | 0.5 | Do. |
| Phosphoric acid, 85% | | 0.5 | Liner slightly brown, no attack. |
| 85% phosphoric/30% fluosilicic. | 1/0.3 | 0.1 | Liner white, no attack. |
| Sulfuric acid, 70% | | 1.1 | Liner black, no visilbe attack. |
| 70% sulfuric/30% fluosilicic. | 1/0.06 | −0.4 | Do. |
| Phosphoric acid, 50%<br>Sulfuric acid, 30% | 1/1 | 0.01 | Liner white, no attack. |
| Phosphoric acid, 50%<br>Sulfuric acid, 30%<br>Fluosilicic acid, 30% | 1/1/0.2 | $^1$ 0.5 | Do.<br>Do. |
| Phosphoric acid, 50%<br>Sulfuric acid, 70%<br>Fluosilicic acid, 30% | 1/1/1.03 | 0.7 | Liner black, no visible attack. |
| Water, distilled | | 0.6 | Liner white, no change. |

$^1$ Pipe at 150° F.

There was no evidence of separation of the liner from the glass overwind, even with the pipe section at 200° F. air exposure. In contrast, general purpose filament wound pipe containing no organic fabric liner is severely attacked by the acidic solutions.

The pipe sections were washed and then recharged with acidic solutions and the values after two month's contact recorded. The results are listed in Table III.

Organic liner mats—0.046″–0.056″.
Pipe wall thickness—0.160″–0.170″.
Glass mat+Overwind—0.114″.

TABLE III
Chemical resistance after 2 months immersion at 200° F.

| Chemical | Acid Mix Ratio, Pts. | Wt. Change, Percent | NOL Tensile,[1] p.s.i. | Strength Retention, Percent | Modulus, p.s.i.×10$^5$ |
|---|---|---|---|---|---|
| Control | | | 20,365 | 100 | 6.05 |
| Air exposure | | −0.1 | 22,020 | 108 | 6.49 |
| Fluosilicic acid, 15% | | 0.4 | 19,155 | 94 | 5.48 |
| Fluosilicic acid, 5% | | 0.4 | 19,600 | 96 | 5.63 |
| Fluosilicic acid, 1% | | 0.3 | 18,280 | 90 | 5.82 |
| Phosphoric acid, 85% | | 0.7 | 22,465 | 110 | 6.10 |
| 85% phosphoric/30% fluosilicic | 1.0/0.03 | 0.7 | 23,510 | 115 | 7.41 |
| Sulfuric acid, 70% | | [2] 2.8 | 25,250 | 124 | 7.88 |
| 70% sulfuric/30% fluosilicic | 1.0/0.06 | [2] 1.9 | 21,490 | 106 | 6.69 |
| 50% phosphoric/30% sulfuric | 1.0/1.0 | 0.2 | 22,540 | 110 | 6.76 |
| 50% $H_3PO_4$/30% $H_2SO_4$/30% $H_2SiF_6$ | 1.0/1.0/0.2 | 0.6 | 18,690 | 92 | 5.70 |
| 50% $H_3PO_4$/30% $H_2SO_4$/30% $H_2SiF_6$ | 1.0/1.0/0.2 | [3] 0.5 | 20,900 | 103 | 5.87 |
| 85% $H_3PO_4$/70% $H_2SO_4$/30% $H_2SiF_6$ | 1.0/1.0/0.3 | [2] 1.7 | 17,890 | 88 | 6.46 |
| Water Distilled | | 0.1 | 19,480 | 96 | 7.32 |

[1] Loading rate of 0.1″/minute.
[2] Pipe liner had discolored, but was intact.
[3] Pipe at 150° F. immersion temperature, 2 months.

EXAMPLE II

A pipe was formed by wrapping a mandrel with a resin impregnated woven polypropylene cloth (pre-shrunk at 120° C., 4 hours; one ply; 4.6 oz./sq. yd.; 0.015″ thick). The resin retention of this cloth was not as great as that of the mats used in Example I, but the cured pipe had a good bond between the cloth and the overwind, the liner surface being smooth and hard and highly resistant to acid attack.

The NOL split disc tensile strength at 75° F. of this pipe composition was 26,980 p.s.i. strength and the pipe had a 7.96×10$^5$ modulus of elasticity.

EXAMPLE II

A pipe ("A") was fabricated using, in sequential winding:

One layer polyester fabric, 1.1 oz./yd.$^2$ (pre-shrunk 1.0 hour at 140° C.)
One layer polypropylene fabric 4.4 oz./yd.$^2$ (pre-shrunk 1.0 hour at 140° C.)
One layer chopped glass strand mat with 10% insoluble polyester binder 1.5 oz./ft.$^2$ A second pipe ("B") was prepared using the procedure and composition of "A" except that a different chopped glass strand mat was used. The details of the procedure and compositions are listed in Table IV.

TABLE IV

Fabrication of polyester resin/fiberglass overwind pipe with pre-shrunk polypropylene non-woven mat pipe diameter: 2″

Pipe liner construction:
  Layers mat:
    A—1 polyester style 5389, 1.1 oz./yd.$^2$, modified acrylic binder, pre-shrink 1.0 hr. 140° C.; 1 polypropylene, Weblox H–612, 4.4 oz./yd.$^2$, mechanical bond, pre-shrink 1.0 hr. 140° C.; 1 chopped glass strand, O.C.F. M–711, 1.5 oz./ft.$^2$.
    B—Same polyester mat+polypropylene mat; 1 chopped glass strand, ferro, PE–265, 1.5 oz./ft.$^2$.
  Resin system—90/10 Atlac 382–05/Atlac 387.03 at 54% solids, styrene monomer; 1.0% benzoyl peroxide.
Overwind fiberglass—O.C.F. 893 finish "K" filament. 8 ends (equivalent to 60 end ("G").
  Tension—1 lb./roving at creel.
  Geometry—4 rovings/band; 4 layers roving at 54¾° angle, reverse drum bucket.
  Overwind resin—Wet wind, 90/10, 382–05/387–03.
  Pipe cure—2.0 hours, 100° C. plus 2.0 hours, 130° C., plus 1.0 hour 140° C.

These pipe sections also showed excellent resistance to acid attack and no separation of the organic fabric from the glass rovings on cure of the resin.

EXAMPLE IV

A two-inch diameter pipe section was fabricated using the following pipe liner organic composition:

(1) a polyester surfacing mat, style 1747 polyester (1.1 oz./yd.$^2$, 1 layer, acrylic binder—no heat pre-shrunk)
(2) a polypropylene backup mat, Weblox H–612 (4.4 oz./yd.$^2$, 1 layer, mechanical bond—pre-shrunk 2.0 hours at 130° C.)
(3) a polyester mat, style 1747 polyester (1.1 oz./yd.$^2$, 1 layer, acrylic binder—no heat pre-shrunk)

followed by:

(4) fiberglass roving overwind.

The polyester resin system, dimensons and quantities are listed in Table V. The cured pipe showed a uniform and well-bonded laminae of thermoset resin non-woven fabrics and fiberglass overwind.

TABLE V

Fabrication of pipe with pre-shrunk polypropylene mat

Liner construction:
  Resin system— 90/10 (wt.) Atlac 382/Atlac 387; 2% BPO paste, 50% active.
  Overwind glass—O.C.F. 893 finish, K–8.
    Tension—1 lb./roving at creel.
    Geometry—4 rovings/bond; 4 layers rovings at 54¾° angle reverse drum bucket.
    Overwind resin—Same as above resin system (wet wind).
  Pipe cure—2.0 hours, 100° C. plus 2.0 hours 130° C.
  Pipe wall thickness—0.150″–0.180″.
  Mats liner thickness—0.060″–0.090″.
  Glass overwind thickness—0.090″.

The pipe showed excellent retention of physical properties even on exposure to acid attack.

EXAMPLE V

Pipe sections were fabricated according to the previous examples with a resin composition of 80 parts general purpose polyester resin and 20 parts of flexibilizer polyester resin. These showed the same excellent chemical resistance and an increased impact resistance, indicating that the impact resistance of the chemically resistant pipe can be regulated by the use of various polyester resin systems.

There has been presented a method of preparing acid resistant fiber reinforced pipe. The pipe is fabricated by using a multi-laminae of an acid resistant polyester or polypropylene fabric, and an overwind of glass fibers.

The polyester resin system integrally bonds the laminae and by pre-shrunk polyester or polypropylene matrices, no separation of the innerliner fabric from the overwound fiber glass rovings occurs on the cure of the polyester resin.

What is claimed is:

1. Process for preparing an acid resistant fiber reinforced pipe comprising:
   (a) subjecting a fabric of a material selected from polypropylene and polyester fabric to an elevated temperature so as to pre-shrink the fabric,
   (b) impregnating the pre-shrunk fabric with a polyester resin,
   (c) forming a first lamina of at least one said pre-shrunk resin impregnated fabric on a mandrel;
   (d) winding a second lamina of polyester resin dipped fiber rovings over said first lamina about said mandrel, and
   (e) curing the resin of said laminae to integrally bond the laminae thereby forming an acid resistant fiber reinforced pipe.

2. The process of claim 1 wherein said second lamina is comprised of helically wound glass fibers.

3. The process of claim 1 wherein said material is polypropylene and said elevated temperature is 120–140° C.

4. The process of claim 1 wherein said material is polyester and said elevated temperature is 120–150° C.

5. The process of claim 1 wherein a plurality of said pre-shrunk fabrics are used to form said first laminae, and said plurality of fabrics are of a material selected from polypropylene and polyester and mixtures thereof.

6. The process of claim 1 wherein the resin content of said reinforced pipe is 35–45% by weight based on the weight of the pipe.

7. The process of claim 5 wherein 70–80% by weight of said resin is present in the organic fabric material laminae of said pipe.

References Cited

UNITED STATES PATENTS 2,815,043  12/1957  Kleiner et al. ........ 138—144
3,429,954  2/1969   Atkins et al. ........ 156—86 XR
3,080,893  3/1963   Craycraft ........... 156—294 XR PHILIP DIER, Primary Examiner U.S. Cl. X.R.

138—144; 156—171, 184; 264—265